DOUBLE-FREQUENCY CODED SYMBOL READER

Filed July 26, 1960 2 Sheets-Sheet 1

INVENTOR
MENDOLE D. MARSH, DECEASED,
BY PATRICIA J. MARSH, ADMINISTRATRIX.
BY A. M. Fernandez
ATTORNEY

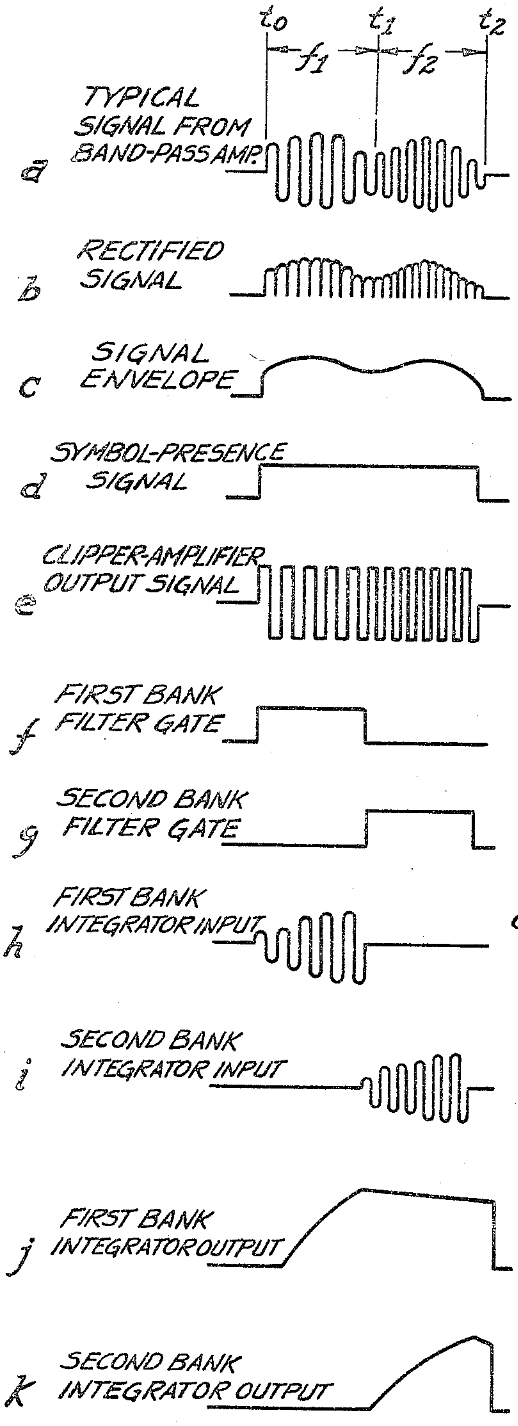
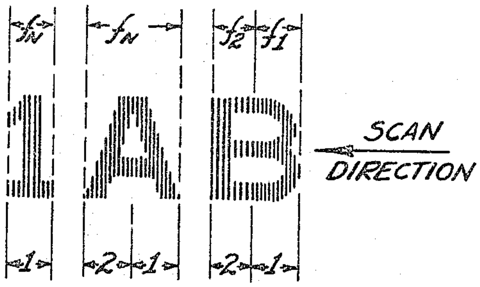
FIG. 2
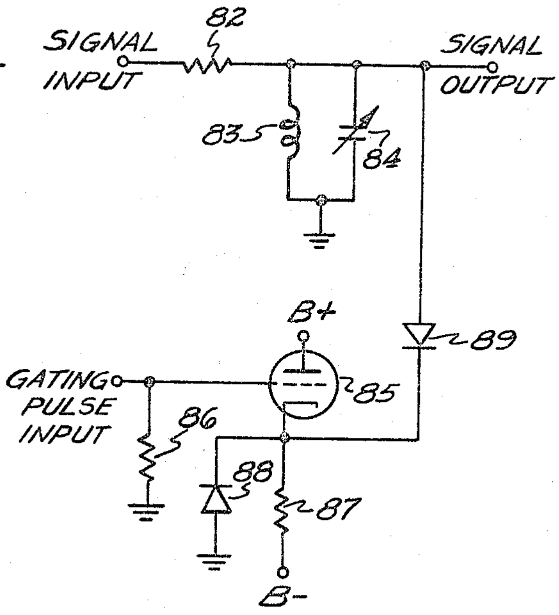
FIG. 4
FIG. 3
INVENTOR
MENDOLE D. MARSH, DECEASED,
BY PATRICIA J. MARSH, ADMINISTRATRIX.
BY A. M. Fernandez
ATTORNEY 3,332,064
Patented July 18, 1967

3,332,064

DOUBLE-FREQUENCY CODED SYMBOL READER

Mendole D. Marsh, deceased, late of Palo Alto, Calif., by Patricia J. Marsh, administratrix, Palo Alto, Calif., assignor to General Electric Company, a corporation of New York Filed July 26, 1960, Ser. No. 45,500
6 Claims. (Cl. 340—146.3)

This invention relates to apparatus for reading symbols recorded on the surface of a document and in particular to apparatus for reading line-space or frequency coded symbols which may be recognized by human beings in accordance with their shape and orientation.

A system is disclosed in a United States Patent 2,961,-649 granted to Kenneth R. Eldredge and Mendole D. Marsh, for automatically reading symbols which are recorded as a plurality of parallel lines equally spaced, the spacing between the lines being different for each different symbol and the area seriated by those lines being so shaped and oriented that they may be recognized by human beings. Since those symbols may also be recognized by their fine-line structure, a given symbol may be electronically read by scanning it with a slit-scan transducer at a constant speed in order to produce an electrical signal having a predominant characteristic frequency which may be recognized and identified with the symbol scanned. To recognize the frequency, the signal from the transducer is first fed to a bank of channels each channel of which has a filter tuned to one of the predominant frequencies corresponding to the fine-line spacing assigned to one of the various symbols which are to be read such as the Arabic numerals from 0 to 9. The particular filter corresponding to the frequency of the symbol scanned delivers an output signal having greater energy than the output signal delivered by any other filter. To identify the frequency recognized with its corresponding symbol, the signals from the filters are integrated and compared. In that manner, the channel having the greatest energy is caused to produce a signal at an output terminal which is uniquely identified with the symbol scanned.

The slit-scan transducer employed may be of the photoelectric type. However, if the symbols are printed in magnetic ink, or ink containing particles capable of being magnetized, the transducer may be either of the photoelectric type or of the electromagnetic type. The latter type is preferred because it can scan a symbol and produce a correct signal even though the symbol may have been covered by some other type of ink not containing magnetizable particles.

There are two other advantages of a frequency coded symbol reading system which do not depend upon the use of magnetic ink. First, such a system can accommodate a wide variety of ink densities and, second, it functions even though a significant portion of the symbol may be obliterated or not printed at all. However, the feasible range of line spacing and the maximum number of distinct frequencies which may be assigned to symbols is limited by the size of the symbols, printing considerations, and permissible skew in the symbol scanning mechanism. For a practical symbol size in the order of from .100 to .125 inch in height and from .05 to .08 inch in width, twelve to fifteen frequencies may be accommodated with a line spacing range from about 75 lines per inch to about 300 lines per inch. This maximum number of twelve to fifteen frequencies is sufficient to accommodate all of the Arabic numerals and some of the symbols usually associated with numerical data such as the plus sign (+). A symbol is defined for the purpose of describing the present invention as a visible sign, such as a single character, letter or numeral, including those signs employed to represent operations, as in mathematics, chemistry and the like, and not as two or more signs which may be grouped to form words, numbers, mathematical equations, chemical formulas and the like.

To expand the number of different symbols that may be line-space or frequency coded, it is necessary to code symbols with two or more distinct frequencies. Thus, if one or two out of four basic frequencies may be assigned to each symbol, a total of sixteen different symbols may be accommodated, each of four with a different one of the four different frequencies and each of twelve with a different pair of the four basic frequencies. In a similar manner, six basic frequencies provide enough unique combinations to accommodate all of the alphabet plus ten numerals and seven basic frequencies provide more than enough combinations to fulfill all present requirements for an expanded frequency coded alphanumeric system. Since such a double-frequency coded system accommodates more symbols with less frequencies, it provides improved frequency recognition and greater reliability because the frequencies assigned to different symbols can be more widely separated in the available range of frequencies.

It has been established that it is feasible to combine two frequencies in one symbol of the practical size described hereinbefore by dividing each symbol into two nearly equal portions, each portion having a different line spacing. An extremely narrow symbol such as the letter I or the numeral 1, however, should be assigned a single frequency throughout. With seven basic frequencies, seven extremely narrow symbols may be single-frequency coded in that manner.

Since the number of different frequencies that can be assigned to a given symbol is determined by its size, it follows that if larger or wider symbols are to be read, triple-frequency coding is feasible and an even greater number of different symbols may then be accommodated. However, as the methods of printing improve, it may become feasible to code each symbol of the aforesaid practical dimensions, including the narrow symbols, with two, three or more frequencies.

The principal object of this invention is to provide apparatus for electronically reading multiple-frequency coded symbols which are so shaped and oriented as to be recognizable by human beings.

Another object is to provide apparatus for reading both wide multiple-frequency coded symbols and narrow single-frequency coded symbols.

Still another object is to provide a system of notation in which symbols that are so shaped and oriented as to be recognizable by the human being are formed by parallel lines which are spaced apart at different intervals in different portions in order to uniquely code each symbol by its parallel-line spacing.

These and other objects are realized in one embodiment of this invention for reading double-frequency coded symbols by coupling a slit-scan transducer to two banks of gated filters, each bank having one filter for each frequency that may be assigned to a symbol. The filters in one bank are gated open for approximately the first half of the symbol scanning period. The other bank is gated open for the remaining portion of the symbol scanning period. A gated integrator measures the energy passed by a given gated filter during the symbol scanning period and a comparator determines whether the energy measured by that integrator is greater than the energy measured by any other integrator connected to a filter in the same bank. Thus, each bank includes a number of separate channels, one channel for each frequency to be recognized and identified. The integrators in the channels of the first bank measure the energy in their respective channels during the first portion of a symbol scanning period and store these measures until after the second portion of the symbol scanning period, at which time the integrators in the channels of the second bank will have measured the energy in their respective channels and stored the corresponding measures. In that manner, the information necessary for frequency identification is simultaneously transmitted from both banks of channels to the comparators at the end of the symbol scanning period. The comparators identify the frequencies and transmit signals to a gated double-frequency decoding network which identifies the symbol scanned by producing a signal at an output terminal which uniquely associates the symbol scanned with the unique combination of frequencies identified.

This system is also adapted to read narrow symbols that are single-frequency coded by connecting the comparators of the first bank of frequency channels to a set of terminals associated with the different narrow symbols through a gated single-frequency decoding network. A network distinguishes the narrow symbols from the double-frequency coded wide symbols, gates only the single-frequency decoding network when a narrow symbol is scanned and gates only the double-frequency decoding network when a wide symbol is scanned.

Other objects and inventions will become apparent from the following description with reference to the drawings in which:

FIG. 2 illustrates the fine-line structure of symbols to be read by this invention;

Figure 1:
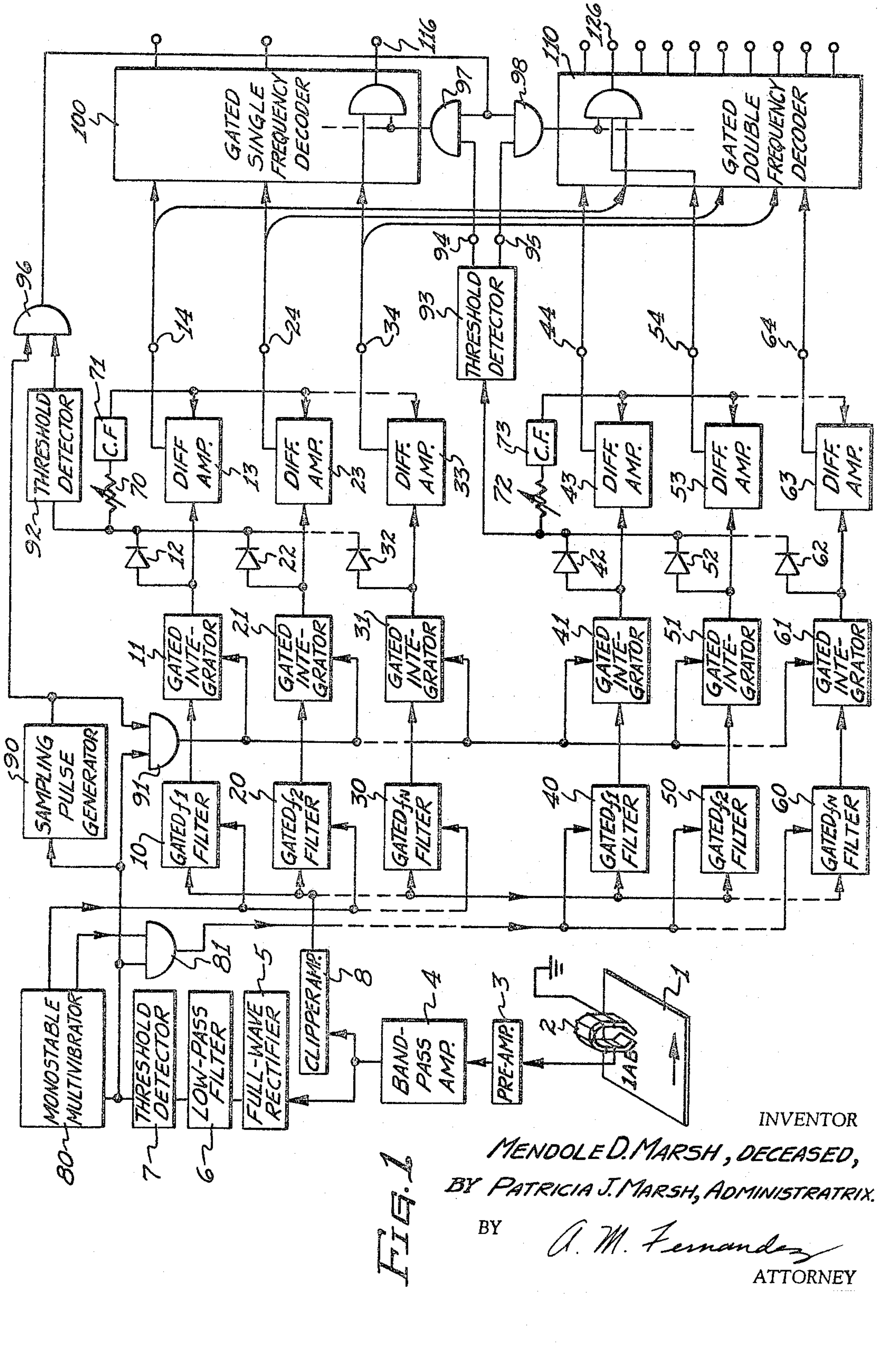
FIG. 1 is a schematic diagram of an embodiment of this invention.

FIG. 3 displays graphs of illustrative signals present in the apparatus of FIG. 1 while a symbol is being scanned; and FIG. 4 is a diagram of a gated filter circuit that may be employed in the apparatus of FIG. 1.

In one embodiment of this invention schematically illustrated in FIG. 1, symbols which have been recorded in magnetic ink on a document 1, or which have been recorded in magnetizable ink and previously magnetized, are scanned with an electromagnetic transducer 2 by moving the document from left to right at a constant speed. However, it must be emphasized that this invention is not limited to magnetic recording and scanning techniques, nor to a given scanning direction since a photoelectric transducer may be used to scan ordinary ink as well as magnetic ink and the scanning direction is a design consideration which may be readily modified.

The symbols 1, A and B recorded on the document 1 are enlarged in FIG. 2 in order that their fine-line structure may be observed. These symbols are representative of the present novel system of notation. Each of the wide symbols A and B are divided into two portions and each portion is assigned one of several line spacings. The combination of the different line spacings assigned to each symbol is unique. The symbol 1 is not divided into two portions because it is too narrow to accommodate more than one group of equispaced lines. Instead, the entire symbol 1 is considered to be a single portion having only one unique frequency assigned to it.

The symbol B has a first line spacing assigned to the first portion and a second line spacing assigned to the second portion such that when it is scanned it successively produces the frequencies $f_1$ and $f_2$ indicated above the symbol. The symbol A has the same line spacing assigned to it throughout both portions and the symbol 1 has the same line spacing assigned to it as is assigned to the symbol A such that scanning the symbols A and 1 produces a single frequency $f_n$ for both portions of the wide symbol A and for the single portion of the narrow symbol 1. Consequently, the unique combination of frequencies $f_1$ and $f_2$, in that order, defines the symbol B and the unique combination of frequencies $f_n$ and $f_n$ defines the symbol A. The symbol 1, on the other hand, is distinguished by the fact that it produces a narrow or short signal having the predominant frequency $f_n$.

The system of FIG. 1, therefore, not only recognizes the frequencies in the signals derived by the transducer 2 but also determines whether each symbol scanned is wide or narrow. On the basis of that information, it will identify the symbol scanned by producing a signal at an output terminal associated with that symbol. However, the system must first determine positively that a signal is present. Accordingly, two main signal paths are provided, a signal-presence path and a symbol-identification path.

The entire system schematically illustrated in the block diagram of FIG. 1 may be implemented with standard vacuum tube or transistor circuits. As each different elemental circuit is mentioned for the first time, a book will be cited which discloses or otherwise teaches the circuit mentioned from the following list: Pulse and Digital Circuits, McGraw-Hill Book Co. (1956), by J. Millman and H. Taub; Applied Electronics, McGraw-Hill Book Co. (1954), by T. S. Gray; Radiation Laboratory Series, vol. 19, Waveforms, McGraw-Hill Book Co. (1948); and Standard Handbook for Electrical Engineers, Eighth Edition, McGraw-Hill Book Co. (1949). The reference to each of these books will be abbreviated to Circuits, Electronics, Waveforms and Handbook, respectively. A person skilled in the art may refer to a particular book cited in order to implement with vacuum tubes a particular elemental circuit. Circuits not described in one of these books will be described herein. It should be understood that this invention is not limited to the employment of circuits specifically described or disclosed in one of the aforementioned books.

Before branching into two paths, the signal from the transducer 2 passes through a suitable preamplifier 3 and a band-pass amplifier 4 having sharp upper and lower cutoff frequencies that are determined by the total spread of the frequencies that may be assigned to the symbols that are to be read. The particular amplifier employed may be selected from the known art represented by Electronics in Chapter 9. The preamplifier may consist of a broad band amplifier coupled to the transducer by a cathode-follower, if necessary, and the band-pass amplifier may consist of a plurality of resistance-capacitance coupled amplifiers. If necessary, the band-pass amplifier may be coupled to the preamplifier by a cathode-follower and it may include a band-pass filter.

A typical signal from the band-pass amplifier is shown in graph *a* of FIG. 3. For the purpose of a later illustration, it may be assumed that the typical signal is derived by scanning the symbol B. In the symbol presence detection path, the signal is first rectified by a full wave rectifier 5 of the type disclosed in Handbook at page 855 and then fed through a low-pass filter 6 of the type disclosed in Handbook at page 90 to obtain the signal envelope which is then distinguished from noise by a threshold detector 7 of the Schmitt trigger circuit type described in Circuits at page 165. The result is a square wave signal or shaped pulse that persists for approximately the full time a symbol is being scanned from the time $t_0$ to the time $t_2$. The output signals of these three symbol-presence detection stages are illustrated in graphs *b*, *c* and *d* of FIG. 3. Symbol-presence detectors of other configurations may be used provided the output signal produced is substantially the same.

The band-pass amplifier 4 is coupled to the symbol-identification path by a clipper-amplifier 8 designed to limit asymmetrical signals at a fixed level above and below their base line to keep noise from being amplified more than the desired signals. A suitable clipper-amplifier circuit is disclosed in said copending application. It consists of a difference amplifier as disclosed at page 20 of Circuits but having the reference signal input terminal of the output vacuum tube connected directly to ground and the cathodes of both vacuum tubes clamped to ground by a diode so polarized that the cathodes may not be driven more negative than ground potential. The clipper-amplifier output signal illustrated in a graph *e* of FIG. 3, is fed into a plurality of channels, each consisting of a gated parallel-resonant filter as shown in FIG. 4, a gated integrator as disclosed in said copending application or as disclosed at page 664 of Waveforms and a difference amplifier as disclosed at page 20 of Circuits. These channels are grouped into two banks, each bank including one channel for each frequency that may be assigned to a symbol. The filters 10, 20 . . . 30 in the channels of one bank are tuned to recognize the respective frequencies $f_1, f_2 \ldots f_n$ assigned to the first portion of the symbols and the filters 40, 50 . . . 60 in the channels of the second bank are tuned to recognize the respective frequencies $f_1, f_2 \ldots f_n$ assigned to the second portion of the symbols. Accordingly, each filter recognizes its associated frequency by passing a greater amount of energy than any of the other filters pass.

It should be noted that frequency recognition may also be accomplished by employing series-resonant filter circuits instead. Then the filter tuned to the characteristic frequency of the symbol being scanned would recognize that frequency by passing a smaller amount of energy than any of the other filters pass. Identification of the recognized frequency would then be accomplished by determining which filter has passed the smallest amount of energy.

The energy passed by each filter is measured and stored by an associated integrator. For instance, the integrators 11, 21 . . . 31 measure and store the energy passed by the respective filters 10, 20 . . . 30 in the first bank. These particular integrators receive energy only while the first portion of the symbol is being scanned. The other integrators 41, 51 . . . 61 receive energy from the respective filters 40, 50 . . . 60 only while the second portion of the symbol is being scanned. The energy measured in each channel is stored until the symbol has been scanned and the symbol-presence signal terminates as indicated by a pair of graphs *j* and *k* of FIG. 3 in conjunction with a pair of graphs *h* and *i* of FIG. 3 for the $f_1$ and $f_2$ channels in the first and second banks, respectively.

The output terminal of the integrators 11, 21 . . . 31 are connected to respective buffer diodes 12, 22 . . . 32 which are so polarized that as energy is measured in the integrators, the diodes tend to conduct. However, only the diode associated with the integrator measuring the greatest energy at the termination of the symbol-presence signal will conduct because conduction through that diode reverse biases the remaining diodes. Similarly, the buffer diodes 42, 52 . . . 62 in the second bank function to provide at the common junction of the diodes a signal having an amplitude which is substantially equal to the greatest integrator output signal in the second bank. The buffer diodes in a given bank may be collectively referred to as a maximum-energy-signal detector. The path for the detector current in the first bank is through a variable impendance element 70 and a cathode follower 71, a circuit diagram of which is disclosed at page 11 of Circuits. The output of the cathode follower is connected to an input terminal of a group of difference amplifiers 13, 23 . . . 33. The output terminal of each integrator 11, 21 . . . 31 is connected to the other input terminal of the difference amplifiers 13, 23 . . . 33, respectively.

The function of the difference amplifiers is to compare the energy measured and stored in each of the integrators in a bank of channels with the maximum-energy-signal detected by the buffer diodes of that bank to determine which channel has measured and stored the greatest energy. The difference amplifier in the channel having the greatest energy stored produces an output signal at one of the output terminals 14, 24 . . . 34 and by that means identifies the frequency derived by scanning the first portion of a symbol.

If the filters are series-resonant circuits, however, a given characteristic frequency is recognized by its associated filter passing less energy than is being passed by any of the other filters, as noted hereinbefore. Accordingly, the comparator for identifying that frequency should be designed to compare the integrals in all of the channels in the bank to determine instead which is the smallest integral.

The direct-coupled or resistance-fed cathode-follower circuit 70, 71 between the maximum energy signal detector 12, 22 . . . 32 and the difference amplifiers 13, 23 . . . 33 reduces the maximum-energy signal sufficiently to bring its maximum amplitude slightly below the greatest voltage amplitude or energy stored in the integrators 11, 21 . . . 31. Otherwise, even the channel having the greatest energy may not produce an output signal. The variable impedence element 70 is directly connected to the grid of the cathode follower 71 and to a grid-bias resistor in the cathode-follower circuit to form a variable voltage-dividing network. Accordingly, adjustment of the variable impendance element 70 makes it possible to vary the voltage difference necessary for proper frequency identification. Similarly, the variable impedence 72 is employed with the cathode follower 73 and difference amplifiers 43, 53 . . . 63 in the second bank to identify the frequencies recognized by the filters 40, 50 . . . 60 and produce a signal at an appropriate one of the output terminals 44, 54 . . . 64.

Both banks are the same except that the filters in the channels of the first bank are gated to recognize only the frequency of the signal derived by scanning the first portion of a given symbol and the filters of the second bank are gated to recognize only the frequency of the signal derived by scanning the second portion of the symbol. The integrated energy of the frequency recognized in the first bank is stored until the frequency recognized in the second bank has been integrated so that frequency-identifying signals may be produced simultaneously during the double-frequency decoding period.

Alternatively, a single bank of channels may be provided on a time-sharing basis for the frequency identification of both portions of the symbol signal. The frequency-identifying signal of the first portion of a given symbol would then be stored in a memory device such as one of several capacitors in a bank until the frequency-identifying signal of the second portion of the signal is obtained in order to provide both frequency-identifying signals to the double-frequency decoding circuit simultaneously.

The manner in which the banks of channels are gated will now be described. Since the filters 10, 20 . . . 30 in the first bank are to be gated to pass only energy contained in the first portion of each symbol signal, the gating pulse applied to those filters is developed by triggering a monostable multivibrator 80 with the leading edge of the symbol presence signal. A suitable cathode-coupled monostable multivibrator is disclosed at page 187 of Circuits. The recovery period of the monostable multivibrator is adjusted to substantially equal the time required to scan the first portion of a symbol. The resulting gating pulse for the first bank is illustrated in a graph *f* of FIG. 3. The gating pulse applied to the second bank of filters 40, 50 . . . 60 is developed by subtracting the gating pulse for the first bank from the symbol-presence signal. This is accomplished by a two-input AND-gate 81 of the type described in Chapter 13 of Circuits, such as the diode AND-gate disclosed at page 398. One input terminal of that AND-gate is connected to the output terminal of the threshold detector 7 which is relatively positive when a symbol signal is present as shown in the graph *d* of FIG. 3. The other input terminal of that AND-gate is connected to the zero or false side of the monostable multivibrator 80 which is normally positive except when it is triggered into its quasi-stable state. Accordingly, because the output terminal of the AND-gate is relatively positive only when both of its input terminals are relatively positive, the output terminal is not at a relatively positive potential to gate the second bank filters 40, 50 . . . 60 except when a symbol signal is present and only after the monostable multivibrator 80 returns to its stable condition, its "true" or "one" output terminal relatively negative. In the meantime, while the monostable multivibrator is in its quasi-stable state, only the filters 10, 20 . . . 30 of the first bank are gated.

The gating pulse for the second bank of filters is shown in a graph *g* of FIG. 3. It may be more clearly understood from the graphs that the second bank of filters are gated after the first portion of the symbol signal has passed only if a wide symbol having a second portion is being scanned because if the symbol-presence signal is produced by a narrow symbol, the AND-gate will not receive a positive signal input after the monostable multivibrator has returned to its stable condition.

Since noise of sufficient amplitude may activate the threshold detector 7, a situation can arise in which a false symbol-presence signal is produced. Such a signal would generally be shorter in duration than a narrow symbol-presence signal, but nevertheless the monostable multivibrator 80 would be triggered. In that case, it is desirable that the filters 10, 20 . . . 30 in the first bank be gated no longer than the duration of the noise so that the integrators 11, 21 . . . 31 will not measure sufficient energy to activate a decoding circuit which will be presently described. To gate the filters off as soon as possible, the monostable multivibrator 80 may be designed to be reset to its stable condition by the trailing edge of the symbol-presence signal if it has not already returned to its stable condition by that time. That may be accomplished, for instance, by differentiating the trailing edge of the symbol-presence signal to obtain a negative-going pulse and applying that pulse through an inverting amplifier to the control electrode or grid of the other side of the monostable multivibrator. Termination of the "false" gating signal as quickly as possible has the additional advantage of squelching the noise signal in the tuned filters at the earliest possible moment so that if a symbol is scanned immediately thereafter the filters in the first bank will be clear and the monostable multivibrator 80 will be ready to develop a proper gating signal.

A suitable gated filter circuit is illustrated in the diagram of FIG. 4. The filter includes an input resistor 82 and a parallel-resonant circuit consisting of an inductance coil 83 and a capacitor 84. A gating pulse is applied to a cathode follower circuit consisting of a triode 85 having its grid biased by a resistor 86 connected to ground, its cathode biased by a load resistor 87 connected to a source of negative direct voltage and its anode connected to a source of positive direct voltage B+. A diode 88 clamps the cathode to ground so that it cannot assume a more negative potential than ground and a diode 89, preferably of the silicon junction type, connects the cathode to an output terminal of the filter circuit.

In the absence of a gating pulse, the cathode of the triode 85 is substantially at ground potential and the cathode of the diode 89 is therefore also substantially at ground potential. Under these conditions any signal present in the filter circuit is shunted by the conducting diode 89, any resonance of the L–C circuit is squelched and substantially no signal appears at the output terminal.

Upon the occurrence of a gating pulse, the triode 85 is rendered conductive, the cathode of the triode 85 is driven positive with respect to ground and the diode 89 is reverse biased. Any signal then present in the filter circuit is presented at the output terminal. Thus, the filter circuit responds to input signals only when the diode 87 is reverse biased. When the diode 87 is forward biased it conducts and the filter is squelched so that energy is not stored in the L–C circuit of the filter. Instead, the filter and the output terminal are clamped to ground. An advantage of this shunt type of gating is that it does not introduce significant energy into the filter. Accordingly, this gated filter circuit makes possible the sharp separation of the two frequencies derived by scanning one symbol as indicated by a pair of graphs *h* and *i* in FIG. 3.

The parallel-resonant circuit 83, 84 has a high impedance at resonance. Therefore, a maximum amount of the resonant signal is translated from its input terminal to its output terminal. As the frequency of the input signal deviates from the resonant frequency of the filter, the amount of energy translated to the output terminal decreases. Conversely, a series resonant circuit consisting of an inductance coil and capacitor connected in series between the resistor 82 and ground has a high admittance at resonance. Consequently, a maximum amount of the resonant signal energy is shunted to ground and a minimum amount is translated to the output channel. Therefore, if series-resonant filters are used in a bank of channels, the comparator circuit must be designed to identify the frequency of the signal applied to a bank of channels by determining which channel has measured the smallest amount of energy, as indicated hereinbefore, instead of the greatest amount of energy.

Returning to the description of the manner in which the two banks of channels are gated, the trailing edge of the symbol-presence pulse is applied to a sampling-pulse generator 90 similar to the monostable multivibrator 80 to initiate the generation of a short sampling pulse which is added to the trailing edge of the symbol-presence signal through an OR-gate 91 of the type described in Chapter 13 of Circuits, such as the diode OR-gate disclosed at page 396. The resulting signal is employed to gate the integrators in both banks to establish the time during which the energy of a signal in each channel is to be measured and stored. Upon the termination of that gating pulse, the integrators are automatically reset. Typical output signals from the banks of integrators are illustrated in a pair of graphs *j* and *k* in FIG. 3.

The maximum integrator signal detected in the first bank in the manner described hereinbefore is threshold detected by a circuit 92 which may be of the Schmitt trigger circuit type but having only a "true" output terminal. Similarly, the maximum integrator signal detected in the second bank is threshold detected by a circuit 93 which may also be of the Schmitt circuit type but having complementary "false" and "true" output terminals 94 and 95. The output of the threshold detector 92 gates the sampling pulse through an AND-gate 96. This insures that the energy content of at least one of the frequencies from the first bank exceeds a predetermined lever before a symbol identification may be made. Otherwise, noise may produce a false symbol identification when no symbol is being scanned.

Similarly, the "false" and "true" output signals of the threshold detector 93 further gate the sampling pulse through an AND-gate 97 if the symbol is narrow and through an AND-gate 98 if the symbol is wide. The distinction between wide and narrow symbols is made in the following manner. The complementary output signals obtained from the "false" and "true" output terminals 94 and 95 are connected to the respective gates 97 and 98. In the absence of a signal in the channels of the second bank, the potential of the output terminal 94 of the threshold detector 93 is relatively positive with respect to a reference potential and the potential of the output terminal 95 is at the reference potential. Therefore, only the AND-gate 97 is enabled. If the sampling pulse generated by the trailing edge of the symbol-presence signal occurs before the filters of the second bank pass sufficient energy to trigger the threshold detector 93, the sampling pulse is steered by the AND-gate 97 to a single-frequency decoder 100. Otherwise, the sampling pulse is steered by the AND-gate 98 to a double-frequency decoder 110.

The decoders 100 and 110 each consist of a plurality of AND-gates. The single-frequency decoder 100 includes one two-input AND-gate for each channel, such as the AND-gate 115, each of which is assigned to or associated with a different single-frequency coded symbol.

One input terminal of each of those AND-gates is connected to the output terminal of the AND-gate 97. The other input terminal of each of those AND-gates is connected to its associated one of the channel output terminals 14, 24 . . . 34. The double-frequency decoder 110 includes a three-input AND-gate for each combination of frequencies assigned to or associated with a different double-frequency coded symbol. One input terminal of each of those three-input AND-gates, such as the AND-gate 125, is connected to the output terminal of the AND-gate 98. Another one of the input terminals is connected to one of the channel output terminals 14, 24 . . . 34 in the first bank and the third input terminal of each triple AND-gate is connected to one of the channel output terminals 44, 54 . . . 64 of the second bank.

In operation, if the symbol 1 of FIG. 2 is scanned, the frequency $f_n$ is recognized by the filter 30, integrated and identified by the difference amplifier 33 as the frequency $f_n$ by presenting a frequency identifying output signal at terminal 34. The other terminals, such as terminals 14 and 24, will not receive an output signal. Since the symbol 1 is narrow, a sampling pulse is produced before significant energy is gated through the filter 60 of the second bank. Consequently, the threshold detector 93 is not triggered and the gate 97 passes the sampling pulse to the single frequency decoder 100 having only one of its AND-gates enabled, the AND-gate 115 connected to terminal 34. Accordingly, the gated sampling pulse from the AND-gate 97 appears at an output terminal 116, of the AND-gate 115 as a symbol-1 identifying signal since the terminal 116 is associated only with the single-frequency coded symbol 1.

If a wide symbol is scanned, such as the symbol B of FIG. 3 having the coding frequencies $f_1$ and $f_2$ assigned to it, a sampling pulse is not produced by the sampling pulse generator 90 until the maximum integrator signal of the second bank has reached a predetermined amplitude and triggered the threshold detector 93 to enable the AND-gate 98 and disable the AND-gate 97. Consequently, the sampling pulse is steered to the double-frequency decoder 110 having only one AND-gate enabled, the AND-gate 125 connected to terminals 14 and 54. Accordingly, the sampling pulse is transmitted to an output terminal 126 of the AND-gate 125 which is the output terminal of the double-frequency decoder uniquely associated with the double-frequency coded symbol B. Each one of the other AND-gates in the double-frequency decoder has a unique combination of controlling input signals so that for any pair of frequencies identified, only one output terminal receives a sampling pulse, the output terminal uniquely associated with the symbol having the unique pair of frequencies assigned to it.

It should be noted that the two frequencies assigned to a given symbol may be the same. For instance, the symbol A in FIG. 2 has the same frequency $f_n$ assigned to both of its portions. The frequency $f_n$ of the first portion is identified by a signal at terminal 34 while the frequency $f_n$ of the second portion is identified by a signal at terminal 64. These two frequency-identifying signals are then decoded by an AND-gate in the double-frequency decoder to produce a symbol-identifying signal at an output terminal associated with the symbol A.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. In a system for reading symbols recorded on a document, said symbols being composed of a plurality of parallel lines, the area striated by said lines of a given symbol being so shaped and oriented as to be recognizable by human beings and being spaced differently in different portions in accordance with a predetermined code, the apparatus comprising: means for scanning said given symbol with transducing means for producing distinct electrical frequency signals characteristic of the different spacing of said lines in said portions; means having a plurality of output terminals responsive to said unique electrical frequency signals for recognizing the different spacing of said lines in different portions and for producing electrical signal pulses at a unique combination of output terminals; and decoding means responsive to said signals at said output terminals for identifying said given symbol.

2. In an information translating system wherein frequency modulated pulses represent a plurality of symbols and each pulse is divided into a plurality of portions, each portion being modulated by a selected one of a plurality of different frequencies, the combination of frequencies selected for a given pulse uniquely defining one of said plurality of symbols, the apparatus comprising: a plurality of banks of frequency selective channels, a given bank being associated with one of said pulse portions and having a plurality of frequency selective channels connected between a source of said given pulse and a plurality of frequency-identifying output terminals, one channel in each bank for each one of said different frequencies, a given channel including a frequency filter having a center frequency corresponding to one of said different frequencies for passing energy of the signal portion associated with said given bank of channels, an integrator connected to said filter means for measuring the energy of said frequency modulated pulse portion passing through said filter means, comparator means for comparing the energy measured by said integrator with the energy measured by all of the integrators in the channels of said given bank to identify the channel measuring the most energy and produce a signal at a corresponding output terminal; a plurality of symbol-identifying output terminals corresponding to one of said plurality of symbols; a plurality of decoding gates having a plurality of input terminals and an output terminal, a given gate having an input terminal connected to a frequency-identfying output terminal associated with one of said channels in each of said banks, the combination of frequency-identifying output terminals connected to said given gate corresponding to a unique combination of frequencies which define the symbol associated with the symbol-identifying terminal connected to said given gate.

3. The combination as defined in claim 2 wherein said filter means includes a gating means for gating through the portion of the modulated pulse associated with said given bank.

4. In an apparatus for reading a plurality of different symbols recorded on a document, each of said symbols comprising: a plurality of substantially parallel lines, the spacing between said lines being of one uniform dimension over a first portion of said symbol and of a second uniform dimension over a second portion wherein said first and second uniform dimensions are selected from a plurality of different dimensions, different combinations of which are assigned to different symbols whereby each symbol is uniquely defined by the combination of dimensions assigned to its portions, the combination comprising: a transducer for scanning said symbols at a constant rate, said transducer being responsive to said parallel lines for generating an output signal having a first predominant frequency characteristic of the dimension between the lines in the first portion of said symbol and a second predominant frequency characteristic of the dimension between the lines in the second portion of said symbol; a first and second bank of gated frequency selective channels, each bank having a distinct channel for identifying each different predominant frequency associated with each different one of said uniform dimensions; means for translating said signals from said transducer to said channels; means responsive to said signals for gating open the channels in said first bank when the first portion of a symbol is being scanned and for gating open the channels in said bank when the second portion of a symbol is being scanned; a plurality of output terminals, each corresponding to a different one of said symbols to be read; and a decoding means coupling said channels to said output terminals for producing a signal at the output terminal corresponding to the symbol read in response to signals from the channels identifying the predominant frequencies produced by scanning the first and second portions of the symbol read.

5. An apparatus for recognizing each of a plurality of wide and narrow symbols, each of said symbols being recorded on a document, the structure of said symbols consisting of a plurality of parallel lines, the wide symbols having two portions, the spacing between said lines in a first one of said portions of a given wide symbol being of one uniform dimension and the spacing between said lines in a second one of said portions of said given wide symbol being of a uniform dimension independent of the uniform dimension in said first portion, the combination of uniform spacing dimensions in said given wide symbol beng unique, the narrow symbols having one portion, the spacing between said lines in said one portion of a given narrow symbol being of one uniform dimension, the apparatus comprising: a transducer for scanning a given symbol to generate an output signal having a predominant frequency for each portion of the symbol scanned which is characteristic of the line spacing of each of said symbol portions; two banks, each bank including a plurality of frequency selective channels, one channel for each predominant frequency characteristic that may be derived from any one of said symbols, each channel including a filter coupled to said transducer having a center frequency corresponding to a different one of said predominant frequencies and an integrator connected to said filter for measuring the energy passed through said filter; each bank further including a comparing means connected to said integrators for comparing the measures of energy in said channels to identify the channel having the greatest energy, thereby identifying the channel which corresponds with the predominant frequency; means for determining if said given symbol is a narrow symbol; a first decoding means responsive to said narrow-symbol determining means and to said comparing means in said first bank for identifying the narrow symbol from which the predominant frequency identified was derived; means for determining if said given symbol is a wide symbol; and a second decoding means responsive to said wide-symbol determining means and to said comparing means in said first and second banks for identifying the wide symbol from which the combination of predominant frequencies identified were derived.

6. Apparatus for converting a plurality of symbols of the human language printed on a document into machine language, each of said symbols printed on a document being composed of a plurality of parallel lines, the spacing between said lines in a first portion of a given symbol being of a first uniform dimension and the spacing between said lines in a second portion of said given symbol being of a second uniform dimension independent of said first uniform dimension, said first and second uniform dimensions uniquely defining said given symbol, comprisng: means for moving said given symbol relative to a transducer at a constant speed, said transducer being responsive to said parallel lines for generating an output signal having a first predominant frequency characteristic of the line spacing of said first portion and a second predominant frequency characteristic of the line spacing of said second portion; filter means for recognizing said first and second predominant frequencies by producing maximum responses to said first and second predominant frequencies; means for applying said transducer output signal to said filter means; means for sensing the maximum responses of said filter means; comparator means responsive to said sensing mean for identifying said first and second predominant frequencies; and decoding means responsive to said comparator means for identifying said given symbol with said first and second predominant frequencies.

References Cited

UNITED STATES PATENTS

| | | | |
|---|---|---|---|
| 1,870,989 | 8/1932 | Eldred | 340—149.1 |
| 2,552,156 | 5/1951 | De France | 340—149.1 |
| 2,961,649 | 11/1960 | Eldredge et al. | 340—149.1 |
| 3,044,696 | 7/1962 | Feissel | 340—146.3 |

FOREIGN PATENTS

| | | |
|---|---|---|
| 1,174,001 | 3/1959 | France. |

DARYL W. COOK, *Acting Primary Examiner.*

JOHN F. BURNS, MALCOLM A. MORRISON, MAYNARD R. WILBUR, *Examiners.*

J. W. DORITY, S. C. CORWIN, G. E. MEYERS, J. E. SMITH, J. I. SCHNEIDER, *Assistant Examiners.*